United States Patent

[11] 3,580,368

| [72] | Inventor | Burnette Heck<br>Bloomfield Hills, Mich. |
|---|---|---|
| [21] | Appl. No. | 829,330 |
| [22] | Filed | June 2, 1969 |
| [45] | Patented | May 25, 1971 |
| [73] | Assignee | General Motors Corporation<br>Detroit, Mich. |

[54] DISC BRAKE COOLING MEANS AND PUMP DRIVE MECHANISM
4 Claims, 2 Drawing Figs.

[52] U.S. Cl..................................................... 188/264,
192/113
[51] Int. Cl..................................................... F16d 65/84
[50] Field of Search........................................ 188/264.2,
264.22, 264, 25, 264 (P); 192/113.2

[56] References Cited
UNITED STATES PATENTS
2,828,840 4/1958 Kelley et al.................. 188/264(.22)
3,303,911 2/1967 Hause et al.................. 192/133(.2)X

*Primary Examiner*—George E. A. Halvosa
*Attorneys*—W. E. Finken and D. D. McGraw ABSTRACT: A liquid-cooled disc brake wherein the cooling liquid is pumped through the brake by a small high-speed rotary impeller pump driven by the rotating hub of the wheel to be braked. The pump drive uses the disc pack to provide a clutch drive when the brake is energized and a slower speed viscous shear drive when the brake is released.

PATENTED MAY 25 1971   3,580,368

INVENTOR.
Burnette Heck
BY
O. D. McGraw
ATTORNEY

DISC BRAKE COOLING MEANS AND PUMP DRIVE MECHANISM

The invention relates to a pump drive mechanism and more particularly to one which utilizes the disc pack of a liquid-cooled disc brake to provide a high-speed drive while the brake is actuated and a low-speed drive through viscous shear action of the cooling liquid when the brake is released. In the disc brake the rotating hub has a series of annular discs splined to it and interleaved with a similar series of stationary discs splined to the brake housing. One of the stationary discs is replaced by a rotatable annular disc which provides the pump drive. This disc is positioned between two of the rotating discs, but is not splined to the hub or the brake housing. When the disc pack is compressed to actuate the brake, the two rotating discs grip the pump drive disc in a clutching manner and drive that disc at the same speed as the speed of the wheel and hub. The outer periphery of the drive disc has a gear formed thereon which meshes with a pump impeller drive gear connected to drive the impeller pump at a considerably higher speed than the speed of rotation of the wheel and hub. When the disc pack is released, the cooling liquid surrounding the stationary and rotating discs as well as the pump drive disc will drive the drive disc when the wheel rotates, but at a lower speed than the speed of the wheel and hub. This drive is through viscous shear action of the cooling liquid.

Such a drive permits the use of a small high-speed impeller to pump the maximum quantity of cooling liquid at the time when it is most needed, that is, when the brake is energized. After the brake is released, the pump continues to be driven, but at a considerably lower speed, so as to circulate cooling fluid until a stable temperature is again reached. By driving the pump through a viscous shear action to obtain the lower speed, the pump requires considerably less power than it would require if it were driven at its normal speed in relation to the wheel and hub. Thus the pump absorbs much less power when it is not needed.

IN THE DRAWING

Figure 1:
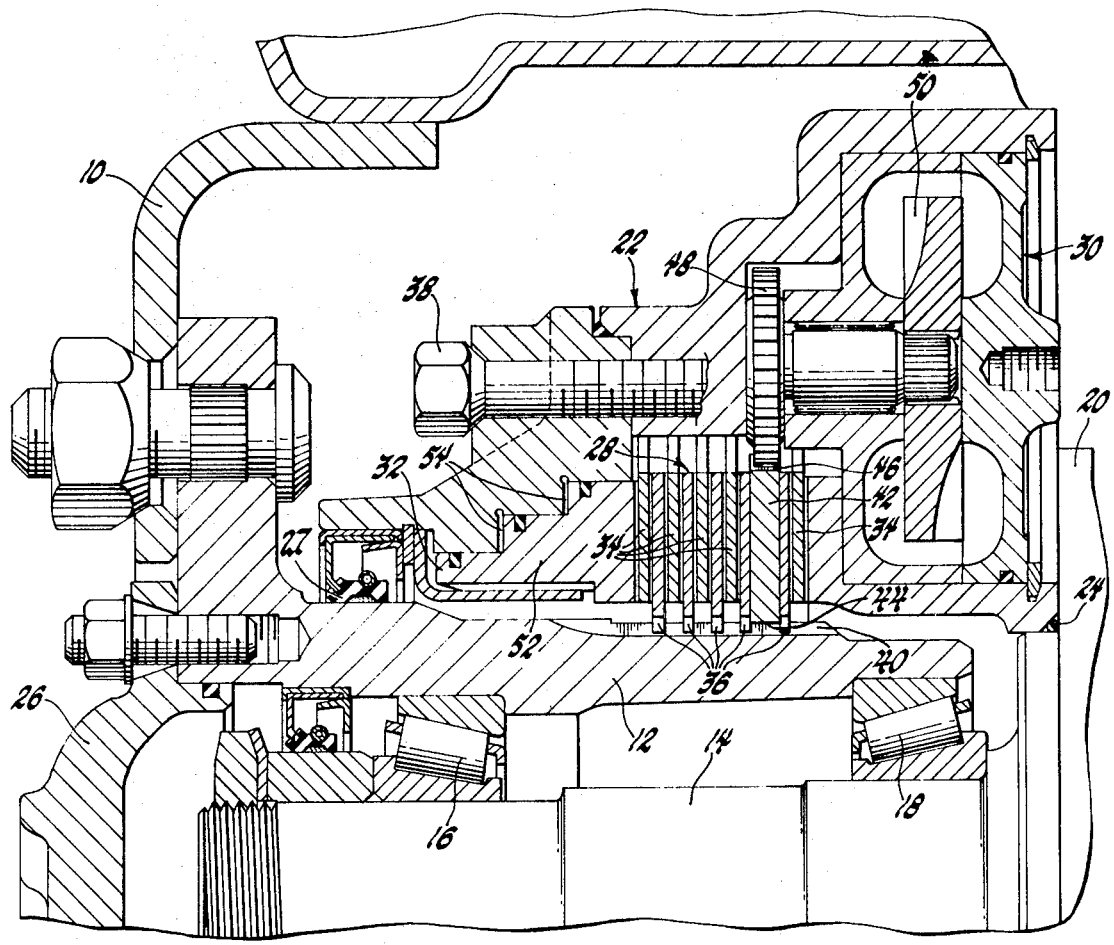
FIG. 1 is a cross section view of half of a vehicle liquid cooled disc brake having a pump drive mechanism embodying the invention, with parts being broken away.

The vehicle wheel 10 is mounted on a hub 12 which is in turn rotatably mounted on the stub axle 14 by means of bearings 16 and 18. The stub axle is part of a stationary support member 20, which may be the steering knuckle of a front wheel or a suitable portion of the axle of a rear wheel assembly. The brake housing 22 is suitably mounted on the support member 20 so that it is stationary. The housing is sealed at 24 to the stub axle and support member assembly. A cap 26 seals the portion of the hub 12 receiving the stub axle 14. The seal 27 seals the outer end of the brake housing 22 to the outer surface of the rotatable hub 12. Thus the interior of the housing is sealed against leakage of cooling liquid.

The housing 22 contains the brake disc pack 28, the cooling liquid pump assembly 30, and the brake-actuating mechanism 32.

The disc pack 28 includes a series of stationary braking discs 34 interleaved with a similar series of rotatable braking discs 36. The outer peripheries of the discs 34 are held against rotation in a splinelike manner by fitting about the housing bolts 38. The rotatable discs 36 have their inner peripheries provided with splines so that they fit on the splines 40 of the hub. Thus the rotatable discs and the stationary discs are able to be moved axially when the brake is energized and released. A pump drive disc 42 is positioned between two adjacent rotatable discs 36 so that when the disc pack is compressed to actuate the brake, the rotatable discs will engage the drive disc 42 in a clutchlike manner, causing the drive disc 42 to be rotated with the rotatable discs, the hub, and the wheel.

In the structure shown in FIG. 1, the inner periphery 44 of disc 42 fits about the outer ends of the hub splines 40 so that the spline ends cooperate therewith to provide a bearing and guiding arrangement for the disc 42. The outer periphery of the disc 42 is provided with gear teeth 46 which mesh with the pump drive gear 48. This gear has a shaft journaled in a portion of the housing 22 providing a part of the pump assembly housing, and is connected to the pump impeller 50 so as to drive that impeller when the drive disc 42 is rotated. The gear ratio of the gear teeth 46 of drive disc 42 and the gear teeth of gear 48 is such that the pump impeller 50 is driven at a considerably higher speed than the speed of rotation of the wheel and hub when the disc pack is energized. When the disc pack is released, the rotatable discs 36 no longer engage the side surfaces of the drive disc 42 in friction-driving relation. However, this space is filled with cooling liquid and, since the rotatable discs 36 are rotating at the speed of the vehicle wheel and hub, there is a viscous shear drive action through the cooling liquid located between the rotatable disc and the pump drive disc 42. This provides a drive for the pump impeller 50 at a much lower speed than before. The friction surfaces of the adjacent rotatable discs and/or the friction surfaces of the drive disc 42 can be so designed as to provide the desired viscous shear drive effect needed to drive the pump impeller at the desired speed ratio in relation to the vehicle wheel while the disc pack is released.

The brake housing 22 has a disc pack actuating piston 52 positioned in the brake-actuating chamber 54 formed as a part of the housing 22. A suitable amount of brake pressure is provided in chamber 54 when the brakes are to be energized, moving piston 52 to compress the disc pack 28 and provide the desired braking action.

Figure 2:
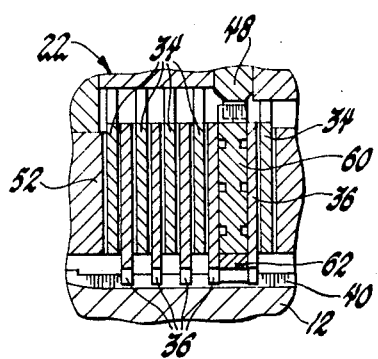
FIG. 2 is a fragmentary cross section view showing a modification of the pump drive mechanism of FIG. 1.

In the modified construction shown in FIG. 2, the pump drive disc 60 has its inner periphery provided with a bearing surface which fits over a bearing and guide ring 62. The outer periphery of ring 62 is provided with a suitable mating bearing surface for the bearing surface of the disc 60. The inner periphery of ring 62 is splined on the splines 40 of the hub 12. In some installations this construction is preferable to provide a complete annular bearing surface for the pump drive disc 60.

What I claim is:

1. A pump drive comprising:

a plurality of rotatable discs to be braked, a plurality of rotationally stationary discs arranged to cooperate with said rotatable discs to form a disc pack, means for selectively compressing said disc pack to brake said rotatable discs and for releasing said disc pack to permit rotation of said rotatable discs relative to said stationary discs, a pump drive disc having opposed side friction surfaces and a drive gear formed thereon and being positioned between and frictionally engageable with two of said rotatable discs, said pump drive disc being clutched in driving relation with said two rotatable discs when said disc pack is compressed, and a driven gear in mesh with said drive gear and operatively driving a pump when said drive gear is rotated, said disc pack being immersed in cooling liquid, and said pump drive disc being driven by viscous shear acting on both sides thereof between said pump drive disc and the rotatable discs adjacent thereto at a speed substantially less than the speed of the rotatable discs when the disc pack is released and the rotatable discs are rotating.

2. The pump drive of claim 1, all of said discs being annular in form and said rotatable discs being mounted by internal splines on a hub having mating external splines, said pump drive disc having an inner peripheral surface positioned in rotational guiding and bearing relation with the radially outer surfaces of said hub splines, and further having said drive gear formed on its outer peripheral surface.

3. The pump drive of claim 1, all of said discs being annular in form and said rotatable discs being mounted by internal splines on a hub having mating external splines, and said pump drive further comprising:

a bearing ring having a splined inner periphery received in meshing relation with said hub external splines between said two rotatable discs and further having a bearing outer peripheral surface receiving said pump drive disc concentrically thereon in bearing relation, said pump drive disc having an inner peripheral surface positioned in rotational guiding and bearing relation with said bearing ring outer peripheral surface.

4. The pump drive of claim 1, further comprising:
means for determining the speed of said pump drive disc relative to the speed of said two rotatable discs, said means including channellike relief areas provided in at least one of the interfacial surfaces providing a friction drive for said pump drive disc when said disc pack is compressed.